United States Patent [19]

Bergkvist et al.

[11] Patent Number: 4,629,325
[45] Date of Patent: Dec. 16, 1986

[54] LEADING MARK INDICATOR

[75] Inventors: Lars A. Bergkvist, Själevad; Ivan Forsen, Sidensjö, both of Sweden

[73] Assignee: Inogon Licens AB, Själevad, Sweden

[21] Appl. No.: 495,357
[22] PCT Filed: Aug. 25, 1982
[86] PCT No.: PCT/SE82/00270
 § 371 Date: May 3, 1983
 § 102(e) Date: May 3, 1983
[87] PCT Pub. No.: WO83/01106
 PCT Pub. Date: Mar. 31, 1983

[30] Foreign Application Priority Data

Sep. 16, 1981 [SE] Sweden .................. 8105509

[51] Int. Cl.⁴ .................. G01C 5/00; G01C 21/00; G02B 27/60
[52] U.S. Cl. .................. 356/399
[58] Field of Search ............ 356/138, 399, 400, 401, 356/374

[56] References Cited

U.S. PATENT DOCUMENTS

| | | | |
|---|---|---|---|
| 3,604,813 | 9/1971 | TeKronnie | 356/401 |
| 4,166,699 | 9/1979 | Bergkvist | 356/401 |
| 4,245,912 | 1/1981 | Bergkvist | 356/374 |
| 4,474,430 | 10/1984 | Bergkvist | 350/322 |

Primary Examiner—R. A. Rosenberger
Attorney, Agent, or Firm—Silverman, Cass, Singer & Winburn, Ltd.

[57] ABSTRACT

A device for indicating a definite direction, comprising a screen located in front and a screen located behind, which comprise opaque lines (3) separated by transparent interstices (4), whereby a moiré pattern arises when the device is viewed. The screens (8,9) have different division. The opaque lines (3) have the same width in both screens (8,9).

According to the invention the device is characterized in that one of the screens (9) is provided with only one opaque line less than the other of the screens (8), that in said one screen the width of a transparent interstice plus the width of an opaque line (3) is greater than or about equal to 1.5 times the width of the opaque line, but smaller than 1.9 times said width, preferably 1.5 times to 1.8 times the width of the opaque line. The two screens, further, are positioned symmetrically in relation to each other so that a central opaque line of one of the screens symmetrically overlaps a central transparent interstice of the other screen.

Hereby a moiré pattern with only one, relatively narrow interference strip is obtained, which is placed symmetrically over the screen surface.

4 Claims, 7 Drawing Figures

LEADING MARK INDICATOR

BACKGROUND OF THE INVENTION

1. Field of the Invention

This invention relates to a leading mark indicator, more precisely to an instrument for indicating to an observer a definite direction.

2. Description of the Prior Art

A device of the kind here concerned is disclosed previously in U.S. Pat. No. 4,474,430.

Said device comprises a screen in front and a screen behind, which include opaque lines separated by transparent interstices, whereby an interference pattern, so-called moiré pattern, arises when an observer views the device. Each of the screens comprises a plate, which is bent centrally to form an obtuse angle, and by attachment means the screen plates are positioned so that the obtuse angles face toward each other. The front screen plate is provided with a screen division which is denser than the screen division of the screen plate behind. Alternatively, the obtuse angles face away from each other, and the front screen plate is provided with a screen division sparser than that of the screen plate behind.

According to said known device, a number of dark interference strips are produced, which are in parallel with each other when the device is viewed in a direction perpendicular to the plane of the screen plates, i.e. the direction or leading mark, which the device is intended to indicate.

When the device is viewed from a direction lying outside the leading mark, which the device is intended to indicate, an interference pattern is formed which consists of a great number of parallel strips, which form a number of arrows, or more properly a fishbone pattern, where interference strips produced by the upper screen surfaces are angular to the interference strips produced by the lower screen surfaces.

Devices of this kind here referred to are known also from U.S. Pat. Nos. 4,166,699 and 3,604,813, which relate to an instrument, at which the moiré pattern is utilized for bringing about indications of a certain horizontal or vertical plane for an observer.

The firstmentioned U.S. Pat. No. 4,166,699 relates to a device, at which three screens are utilized, and a predetermined plane is indicated in that a great number of interference strips are in parallel, and the observer being outside said plane is indicated in that an interference pattern including lines with a discontinuous angular deviation arises.

The second one of the aforesaid patents, U.S. Pat. No. 3,604,813, relates to a device, at which two screen plates are arranged angularly relative to each other, and the division of the screens, i.e. the number of opaque lines per length unit perpendicular to the opaque lines, is chosen so that an interference pattern arises, which is intended to be read in respect of the pattern symmetry. It is extremely difficult to accurately determine the indicated plane by means of such a pattern.

All of said known devices, thus, are designed to form a great number of interference strips, the angles of which in one direction or the other form discontinuous angle variations or asymmetric patterns when an observer is outside the plane or direction, which the device is intended to indicate.

The total width of opaque lines normally is such that it exceeds or is substantially equal to the total width of transparent interstices.

This implies that such an instrument is difficult to read, especially on a large distance. The reasons substantially are two. A first reason is that an observer is met only by the light which is transmitted through the screens, i.e. light of a surface of about half the device surface perpendicular to the viewing direction.

It is, for example for navigation purposes, essential that as great a proportion as possible of luminous surface is obtained in order to increase the visibility of the device, especially at a long distance or in bad weather.

A second reason is due to the fact that a large number of dark interference strips and light interspaces by necessity gives that each interference strip and each interspace is relatively narrow in comparison with its length, wherereading of the interference pattern is made more difficult, especially at greater distances or in bad weather.

SUMMARY OF THE INVENTION

The present invention relates to a device of the aforesaid kind, by means of which a substantially more distinct indication is obtained, and which is substantially easier to read at a longviewing distance.

The present invention, thus, relates to a device for indicating a definite direction, comprising a screen in front and a screen behind, which include opaque lines separated by transparent interstices, whereby an interference pattern, so-called moiré pattern, arises when the device is viewed, which screens have different divisions, i.e. different distances between the opaque lines, which lines have the same width in both screens, and which transparent interstices have the same width within a screen, of which screens at least one is bent centrally to form an obtuse angle. The invention is characterized in that one of the screens is provided with only one opaque line less than the other one of the screens, that in said one screen the width of a transparent interstice plus the width of an opaque line is greater than or about equal to 1.5 times the width of the opaque line, but smaller than 1.9 times the width of the opaque line, preferably 1.5 times to 1.8 times the width of the opaque line, and that the two screens are located symmetrically relative to each other, so that a central opaque line of one of the screens symmetrically overlaps a central transparent interstice of the second screen.

BRIEF DESCRIPTION OF THE DRAWING

The invention is described in greater detail in the following, with reference to the accompanying drawing, in which.

DESCRIPTION OF THE PREFERRED EMBODIMENTS

Figure 1:
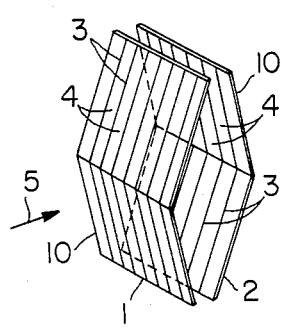
FIG. 1 shows a screen set according to a first embodiment.

In FIG. 1 a screen set according to a first embodiment of the invention is schematically shown, at which each screen 1,2 includes opaque lines 3 separated by transparent interstices 4. The screens 1,2 are positioned so overlapping that an observer viewing the screens from a direction indicated schematically by the arrow 5 looks through screens located in front and behind. Hereby an interference pattern, so-called moiré pattern, arises when the observer views the device.

The screens 1,2 have different divisions, i.e. different numbers of opaque lines per length unit perpendicular to the opaque lines. According to this set, the screen plate 1 in front is provided with a division which is denser than that of the screen plate 2 behind. Each screen 1,2 comprises a plate, which is bent centrally to form an obtuse angle. The angle can be between 120° and 170° or smaller or greater, depending on the desired sensitivity to changes in the interference pattern in response to the deviation of an observer from the leading mark. When the angle is small, the interference pattern is changed for a very small deviation from the leading mark. At a greater angle the interference pattern changes first after a greater deviation from the leading mark.

Figure 2:
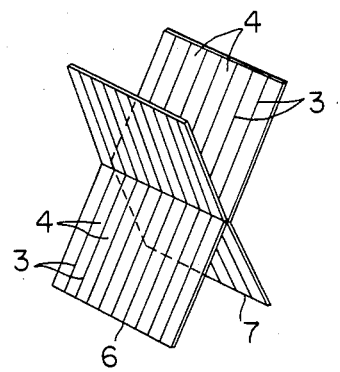
FIG. 2 shows a screen set according to a second embodiment.

In FIG. 2 a second screen set is shown, at which the screens 6,7 are arranged so that the obtuse angles face away from each other.

In this case the screen plate 6 in front is provided with a sparser division than the screen plate 7 behind.

Figure 3:
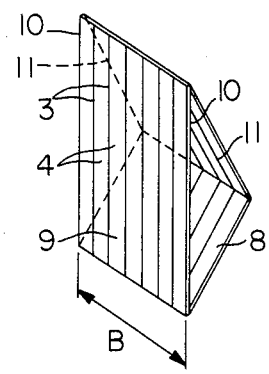
FIG. 3 shows a screen set according to a third embodiment.

In FIG. 3 a third screen set is shown, at which the screen 8 located behind is formed as a screen plate which, as the screen plates 1,2,6,7 according to FIGS. 1 and 2, consists of rectangular or square plane plates, which after having been provided with a screen running in parallel with two sides is bent at said angle perpendicularly to the screen lines. This implies, that each screen plate has parallel sides where each screen line is in parallel with two opposed parallel sides. The screen 9 in front according to FIG. 3 consists of a plane screen plate, which also is provided with screen lines in parallel with its sides. According to this embodiment, the screen plate 9 in front has a denser screen division than the screen plate 8 behind. The angle between screens in the screen plate 8 located behind is chosen so that the tangent (tan) for half the angle is half the tangent (tan) for half the angle for the screens in FIGS. 1 and 2, the sensitivity thereby remaining the same.

Figure 5:
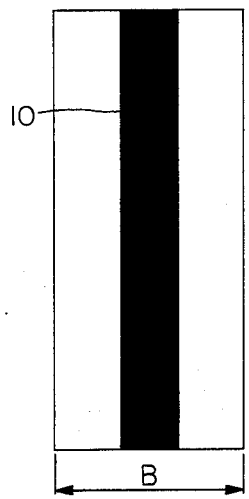
FIG. 5 is a view of the device seen along its indicated leading mark.

According to the present invention, the screens are designed so that only one interference strip is obtained across the entire surface of the device. See FIG. 5.

Figure 6:
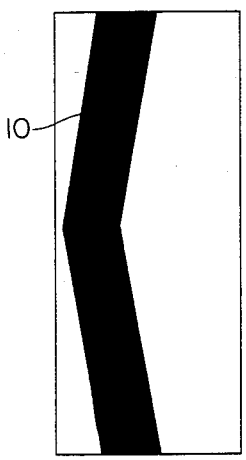
FIG. 6 is a view of the device seen to the right of its indicated leading mark.
Figure 7:
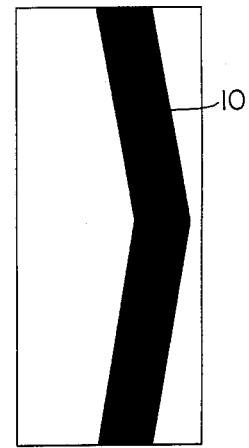
FIG. 7 is a view of the device seen to the left of its indicated leading mark.

When the device is viewed from a direction located to the right of the leading mark, the interference pattern according to FIG. 6 arises, and when the device is viewed from a direction located to the left of the leading mark, the interference pattern shown in FIG. 7 arises. The arrow-shape of the interference patterns, thus, indicates the correction direction for coming to the leading mark.

Figure 4:
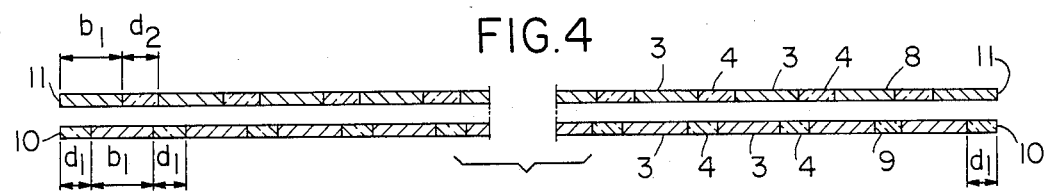
FIG. 4 is a schematic view of the location of the screen lines relative to each other in the front and, respectively, behind screen.

This is effected according to the invention, in that one of the screens 2,6,8 and, respectively, 1,7,9 is provided with only one opaque line more than the other one of the screens, whereby only one interference strip 10 is obtained. This is illustrated in FIG. 4 where the screen 9 in front includes opaque lines with a width of $b_1$ and transparent lines with a width of $d_1$. The screen 8 located behind also includes opaque lines with a width of $b_1$, but transparent interstices with a slightly greater width $d_2$.

In order to obtain the interference strip 10 be located symmetrically over the screen surface, the opaque lines of the screen in front are offset at the outer edges 10 of the screen relative to the opaque lines of the screen located behind.

This symmetry, for the interference strip 6 to arise in symmetric position on the screen when the observer is on the leading mark, implies that the screens shall be positioned so in relation to each other, that the central opaque line on one of the screens shall overlap symmetrically a transparent interstice on the second screen, which interstice constitutes the centre of the second screen.

According to a preferred embodiment, at the screen 8 located behind an opaque line is located immediately close to each of its edges 11, while at the screen 9 in front the opaque line located closest to the respective edge 10 of the screen 9 runs at a distance $d_1$ from the edge 10.

When $N_1$ designates the number of lines 4 in the screen 9 in front, and $N_2$ is the number of lines 4 in the screen 8 located behind, and when B is the width of the screens, according to the invention the screens, with the designations in FIG. 4, are designed so that the following relations are met.

$$N_1 = (B - d_1)/b_1 + d_1) \tag{1}$$

$$N_2 = N_1 - 1 \tag{2}$$

$$b_1 + d_2 = (B - b_1)/(N_2 - 1) \tag{3}$$

The aforesaid applies depending on which of the embodiments according to FIGS. 1, 2 or 3 it refers to. Furthermore, what is said concerning the screen in front applies to the screen located behind, and vice versa, when it is desired that the deviation direction, instead of the correction direction, shall by indicated by the interference strip 10.

According to the invention, furthermore, the width of the interference strip 10 is at maximum one third of the width B of the device, i.e. of the screen plates 1,2,6,7,8,9.

This is brought about in that the transparent interstice 4 in the screen in front is at least about 0.5 times the width of the opaque line 4, i.e. that one period $(b_1 + d_1)$ shall be at least $1.5 \times b_1$. By increasing the transparent interstice so that one period is $1.6 \times b_1$, the width of the interference strip decreases to about one fourth of the width B of the screens. The period under all circumstances shall be smaller than $2.0 \times b_1$, because a period of $2.0 \times b_1$ implies transparent interstices being as wide as opaque lines. According to the present invention, the period shall be smaller than $1.8 \times b_1$, and preferably between about $1.5 \times b_1$ and $1.6 \times b_1$. When a period exceeding $1.8 \times b_1$ is chosen, the interference strip for most of the applications will be too narrow in respect of the visibility, which then decreases.

An increase in the width of the transparent interstice implies that the difference in division between the screen in front and the screen behind increases, which in its turn implies a lower sensitivity—measured as deviation from the leading mark necessary for the interference strip to deflect. However, a greater contrast between the interference strip and surrounding light surfaces is obtained.

According to a preferred embodiment, the screens are designed so that the screen in front has a division period of $1.5 \times b_1$ to $1.6 \times b_1$.

This design, thus, yields a relatively narrow interference strip, with very good contrast to surrounding light surfaces, and a very high sensitivity at the aforesaid angle of the screens according to FIGS. 1 and 2 of about 150° and a corresponding angle of the screens according to FIG. 3 of about 120°.

Practical experiments have shown, that the eye sees much easier a deviation when there is only one interference strip, especially at long distances, compared with when the interference pattern consists of a great number of interference strips. The visibility, further, increases substantially in that the light surfaces at a device according to the invention are proportionally greater than at known devices of the kind here referred to.

A device according to the invention preferably is provided behind the screen located behind with light sources in the form of sodium lamps or high-pressure lamps, so that yellow light is transmitted through the screens in the direction to the observer.

The present invention must not be regarded restricted to the embodiments set forth above. The screen located behind, for example, can be designed wider than the screen in front, whereby opaque lines are located in those portions of the screen located behind which project out at the side of line-free portions on the screen in front, in order thereby additionally to increase the area of the light surfaces.

The opaque lines, further, instead of being designed on a plate, can consist of clamped strips or corresponding means.

The invention, thus, can be varied within the scope of the attached claims.

We claim:

1. An instrument for indicating a definite direction comprising, a front screen and a rear screen located behind the front screen, a plurality of opaque lines on said screens, said lines having the same width in both screens and being separated by transparent interstices to produce an interference moire pattern when the instrument is viewed by an observer, the spacing distance between the lines on one screen being different than the spacing distance between the lines on the other screen, the transparent interstices within each screen having the same width, at least one of said screens being bent generally centrally to form an obtuse angle, said bend dividing said screen in two screen portions, said two screen portions each being non-parallel to said other screen, the number of opaque lines on one screen being one more than the number of opaque lines on the other screen, wherein in the screen having one more opaque line the width of a transparent interstice plus the width of an opaque line is greater than or about equal to 1.5 times the width of the opaque line but less than about 1.9 times the width of the opaque line, said screens being positioned laterally generally symmetrically in relation to each other, and a central opaque line of one screen laterally generally symmetrically overlapping a central transparent interstice of the other screen, whereby when the instrument is viewed in a plane perpendicular to said screens one interference band only is observed.

2. An instrument as claimed in claim 1 in which the width of a transparent interstice plus the width of an opaque line on said screen having one more opaque line is between 1.5 times to 1.8 times the width of the opaque line.

3. An instrument as claimed in claim 1 in which the rear screen is the screen bent to an obtuse angle which faces the front screen, said front screen being planar.

4. An instrument as claimed in claim 1 in which the front screen is the screen having the number of opaque lines one more than the number of opaque lines on the rear screen.

* * * * *